US006983462B2

(12) United States Patent
Savov et al.

(10) Patent No.: US 6,983,462 B2
(45) Date of Patent: Jan. 3, 2006

(54) METHOD AND APPARATUS FOR SERVING A REQUEST QUEUE

(75) Inventors: Andrey I. Savov, Laguna Hills, CA (US); Man M. Garg, Cerritos, CA (US)

(73) Assignees: Toshiba Corporation, (JP); Toshiba Tec Kabushiki Kaisha, (JP)

( * ) Notice: Subject to any disclaimer, the term of this patent is extended or adjusted under 35 U.S.C. 154(b) by 756 days.

(21) Appl. No.: 10/098,240

(22) Filed: Mar. 15, 2002

(65) Prior Publication Data

US 2003/0177164 A1    Sep. 18, 2003

(51) Int. Cl.
*G06F 9/46*    (2006.01)
(52) U.S. Cl. .................. 718/104; 709/226; 709/229; 719/313; 719/314
(58) Field of Classification Search ........ 718/100–108; 719/313–314, 328; 709/226–229
See application file for complete search history.

(56) References Cited

U.S. PATENT DOCUMENTS

| 5,220,674 | A | 6/1993 | Morgan et al. |
|---|---|---|---|
| 5,619,649 | A | 4/1997 | Kovnat et al. |
| 5,634,073 | A | 5/1997 | Collins et al. |
| 5,659,795 | A | 8/1997 | Duvall et al. |
| 5,709,377 | A | 1/1998 | Yoshioka et al. |
| 5,752,031 | A | 5/1998 | Cutler et al. |
| 5,923,826 | A | 7/1999 | Grzenda et al. |
| 5,930,465 | A | 7/1999 | Bellucco et al. |
| 5,982,995 | A | 11/1999 | Covert et al. |
| 5,983,051 | A | 11/1999 | Mishima et al. |
| 6,041,183 | A | 3/2000 | Hayafune et al. |
| 6,047,334 | A | 4/2000 | Langendorf et al. |
| 6,141,701 | A | 10/2000 | Whitney |
| 6,145,032 | A | 11/2000 | Bannister et al. |
| 6,182,120 | B1 | 1/2001 | Beaulieu et al. |
| 6,256,659 | B1 | 7/2001 | McLain, Jr. et al. |
| 6,260,077 | B1 | 7/2001 | Rangarajan et al. |
| 6,792,611 | B2 * | 9/2004 | Honishi et al. .............. 719/328 |

OTHER PUBLICATIONS

Michael Main, "Data Structures and Other Objects Using C++", 1997, Addison Wesly, pp. 349, 366-371.*
Microsoft Computer Dictionary, 2002, Microsoft Press, p. 472.*

* cited by examiner

*Primary Examiner*—Meng-Al T. An
*Assistant Examiner*—Jennifer To
(74) *Attorney, Agent, or Firm*—Tucker Ellis & West LLP

(57) ABSTRACT

A system and method is provided for implementing a thread safe request queue. The request queue is preferably implemented using a circular array and atomic operations are preferably used for non-blocking functionality. In a preferred embodiment of the present invention, the request queue is capable of simultaneous thread release so that threads dequeue only when they are ready to be processed.

8 Claims, 7 Drawing Sheets

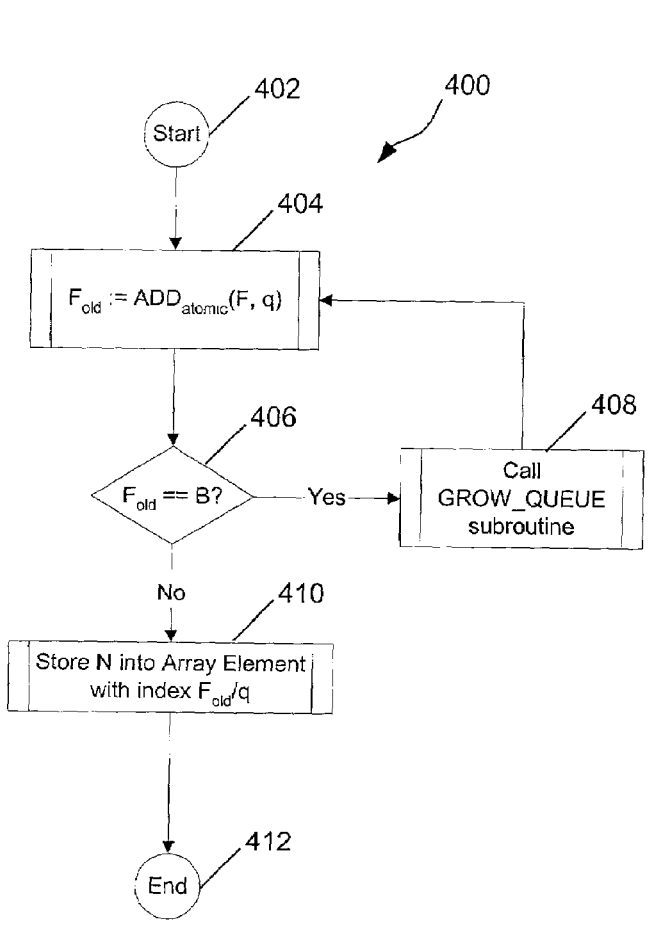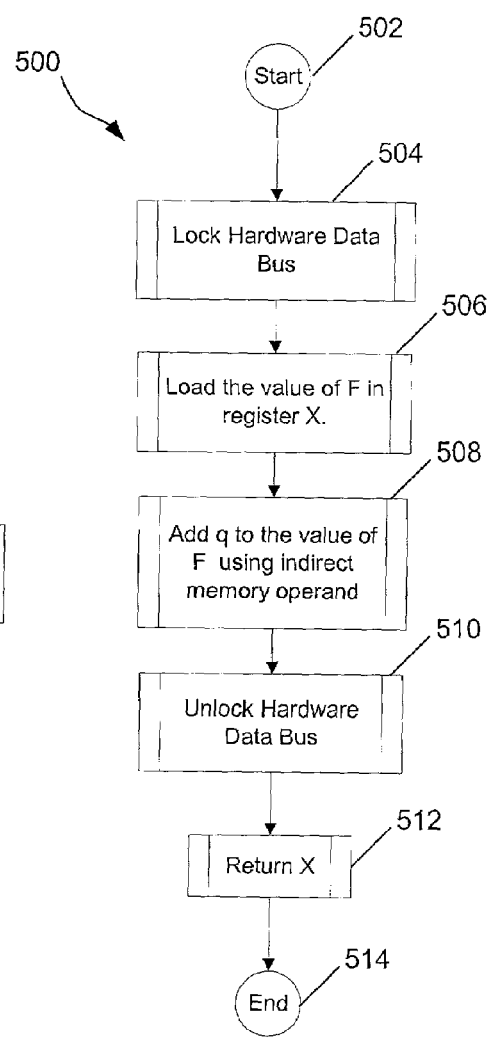
Fig. 4
Fig. 5

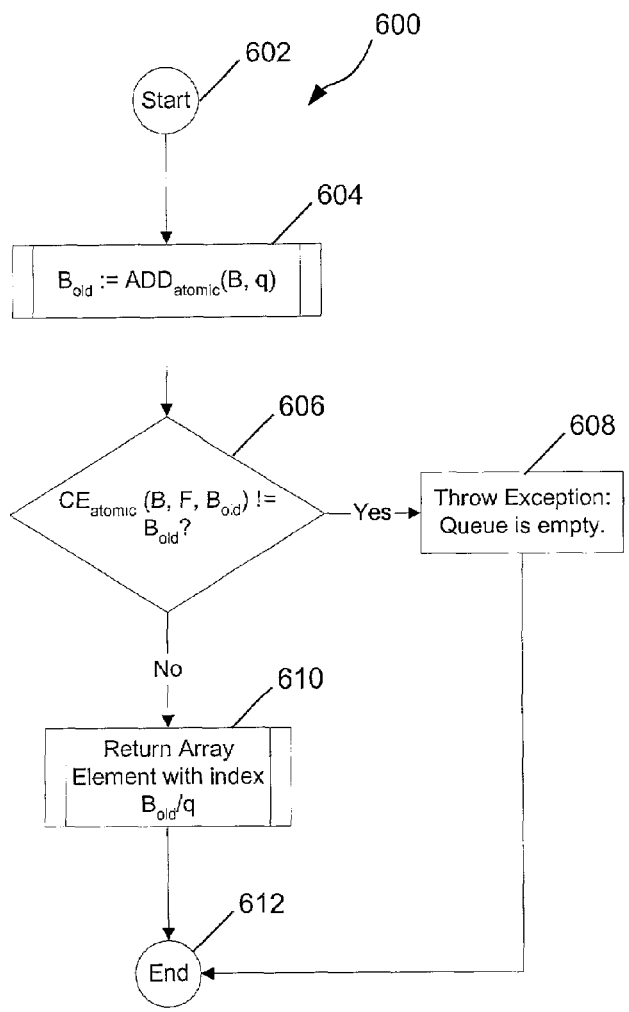
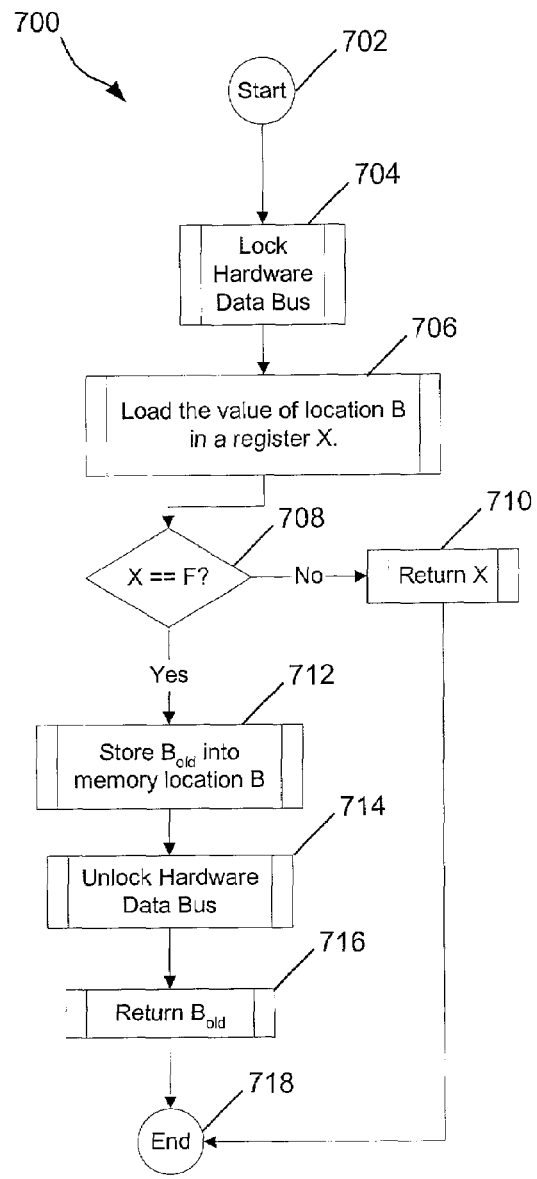
Fig. 6
Fig. 7

METHOD AND APPARATUS FOR SERVING A REQUEST QUEUE

BACKGROUND OF THE INVENTION

This invention pertains generally to symmetric multi-processing, and more specifically to a method and system for serving in a thread-safe manner a request queue in a multi-processing environment.

Symmetric Multi-Processing ("SMP") has become de facto standard for multi-processor hardware architectures. There are several highly popular Operating Systems ("OS") that incorporate support for SMP. A multitasking operating system divides the work that needs to be done among "processes," giving each process memory, system resources, and at least one "thread" of execution, which is an executable unit within a process. While a "process" logically represents a job the operating system must do, a "thread" represents one of possibly many subtasks needed to accomplish the job. For example, if a user starts a database application program, the operating system will represent this invocation of the database as a single process. Now suppose the user requests the database application to generate and print a report. Rather than wait for the report to be generated, which is conceivably a lengthy operation, the user can enter another database query while this operation is in progress. The operating system represents each request—the report and the new database query—as separate threads within the database process.

The use of threads to represent concurrent user requests extends to other areas of the operating system as well. For example, in a server application that accepts requests from a number of different clients, there will typically be many incoming requests to the file server, such as read and write requests. At any given time during the operation of a computer system, there may be a large number of incoming requests to an application program, a server, or other processor of requests. An application program may process these requests by representing each incoming request as a thread of execution. The threads are provided by the operating system and can be scheduled for execution independently on the processor, which allows multiple operations to proceed concurrently.

Multitasking can cause contention for system resources that are shared by different programs and threads. Shared system resources comprise sets of data or physical devices. In order to resolve the contention for shared resources, the computer operating system must provide a mechanism for scheduling the execution of threads in an efficient and equitable manner, referred to as thread scheduling. In general, thread scheduling requires the operating system to keep track of the execution activity of the pool of threads that it provides to application programs for processing incoming user requests. The operating system also determines the order in which the threads are to execute, typically by assigning a priority level to each thread. The objective of the operating system is to schedule the threads in such a way that the processor is always as busy as possible and always executing the most appropriate thread. The efficiency in which threads are scheduled for execution on a processor distinguishes one operating system from another.

In multitasking operating systems ("OS"), thread scheduling is more complex than simply selecting the order in which threads are to run. Periodically, a thread may stop executing while, for example, a slow I/O device completes a data transfer or while another thread is using a resource it needs. Because it would be inefficient to have the processor remain idle while the thread is waiting, a multitasking operating system will switch the processor's execution from one thread to another in order to take advantage of processor cycles that otherwise would be wasted. This procedure is referred to as "context switching." When the I/O device completes its data transfer or when the resource that the thread needs becomes available, the OS will eventually perform another context switch back to the original thread. Because of the extraordinary speed of the processor, both of the threads appear to the user to execute at the same time.

Certain OSs, such as the "WINDOWS NT" OS, schedule threads on a processor by "preemptive multitasking," i.e., the OS does not wait for a thread to voluntarily yield the processor to other threads. Instead, each thread is assigned a priority that can change depending on requests by the thread itself or because of interactions with peripherals or with the user. Thus, the highest priority thread that is ready to run will execute processor instructions first. The operating system may interrupt, or preempt, a thread when a higher-priority thread becomes ready to run, or after the thread has run for a preset amount of time. Preemption thus prevents one thread from monopolizing the processor and allows other threads their fair share of execution time. Two threads that have the same priority will share the processor, and the OS will perform context switches between the two threads in order to allow both of them access to the processor.

Because of the multiprocessing capabilities of current OSs, there is an elevated need for SMP-aware software. One such application for SMP-aware software is the control and service of a print queue. The basic abstraction of an SMP system is a Multi-Threaded Environment ("MTE"). The MTE abstraction is provided by the OS as described mentioned above without regard to the actual number of processors running. Therefore, when software is written to make use of a MTE, one can achieve a performance improvement whether or not the SMP hardware platform contains multiple processors.

The single basic MTE entity is thread. Threads are independent units or paths of execution that operate in a Virtual Memory Address Space ("VMAS"). The contents of the VMAS are specific to processes. Different processes generally have different VMAS (with the exception of shared memory between processes where memory is mapped to the same virtual address in more than one process) while different threads share the VMAS of the process.

In order for MTE software to run successfully, it must synchronize the access of individual threads to shared data. Generally, this synchronization is accomplished through Synchronization Objects (SO) maintained by the MTE. These SO guarantee that only a predetermined number of threads can access a shared resource, while all other will get blocked. The number of threads that run simultaneously depends on the number of processors on the SMP platform. Blocking is a mechanism for temporarily suspending a thread from execution. During the scheduling operation, individual threads in potentially different processes have an opportunity to run either for a period of time or until they are blocked. If a thread is blocked, it will not be scheduled to run. Once the thread returns to an unblocked state, it will be scheduled to run. This type of synchronization is known as blocking synchronization and it is achieved through software implementation.

An alternative form of synchronization known as non-blocking synchronization is controlled by what are known as atomic operations. These are operations that complete before any other processor or hardware resource is given a chance to interact with the system. Typically, these operations are implemented as individual processor instructions. Whenever an individual processor executes an atomic instruction, all other processors are blocked from accessing memory or other hardware resources that may preclude the execution of the atomic operation in progress. In this manner, synchronization is achieved through hardware implementation. During blocking synchronization, the thread state is changed from "running" to "blocked" and vice versa. During non-blocking synchronization, however, no state change is required. Consequently, non-blocking synchronization is generally orders of magnitude faster than blocking synchronization.

Client-server architecture is frequently used in today's computer systems. Often, client-server architecture can be represented by a one-to-many relationship between servers and clients in a network, where one server is expected to respond to requests issued from the many clients. Most intelligent Digital Imaging Devices ("DID") contain an internal device controller which is a fully functional computer with the necessary hardware and software that ensure proper operation of the DID. Generally, the DID in this architecture acts as a server and the user desktops act as clients.

In order to process requests from clients efficiently, servers Request Queues ("RQ"). RQs are data structures that hold requests sent from a client to the server. Such requests are suitably simple requests, such as requests to retrieve server status, or complex requests, such requests to print a plurality of documents. In order to ensure maximum server availability fulfill such requests, servers enqueue requests on the RQ and process them as server resources become available. This allows a server to acknowledge requests more quickly. Generally, a server maintains two pools of threads—one for enqueueing incoming requests and one for processing the requests from the queue. In between these pools is the RQ, which serves as an intermediate storage for the incoming requests, while a thread of the dequeueing pool becomes available. The threads from the dequeueing pool usually process the requests as well, although that is not necessarily the case. Again, when this MTE is deployed on SMP hardware, some of the threads will actually run in parallel and hence improve performance.

When the number of threads in both pools increases, the amount of contention for the RQ also increases. When the goal is to provide high availability server and to lower request-processing times, the exact method of queue implementation and thread pool maintenance make a significant difference in performance. Furthermore, when dealing with multi-processing techniques, it is important that data be "thread-safe," or protected from simultaneous modification by different threads. One such method of preventing unwanted interactions is to use a semaphore technique, as is known in the art.

SUMMARY OF THE INVENTION

It is therefore an object of the present invention to provide an improved method of serving a request queue. The method comprises an enqueueing procedure, which suitably comprises acquiring a semaphore, which is suitably a blocking semaphore, to determine the number of channels to acquire. Upon acquisition of the blocking semaphore, a blocking semaphore count is suitably decremented. The method further comprises acquiring at least one channel from which an incoming request is received. After an incoming request is received, it is suitably enqueued, and a dequeueing semaphore count is suitably decremented. The method further comprises a dequeueing procedure, which suitably comprises acquiring the dequeueing semaphore to determine the number of requests to dequeue. Upon acquisition of the dequeueing semaphore, the dequeueing semaphore count is suitably decremented. An enqueued request is suitably dequeued and processed and the blocking semaphore count is suitably incremented.

DESCRIPTION OF THE FIGURES

FIG. 4 is a diagram illustrating the flow of the enqueue process of an embodiment of the present invention;

FIG. 5 is a diagram illustrating in detail the functionality of the atomic add operation;

FIG. 6 is a diagram illustrating the flow of the dequeue process of an embodiment of the present invention;

FIG. 7 is a diagram illustrating in detail the functionality of the atomic compare exchange operation;

DETAILED DESCRIPTION OF THE INVENTION

Figure 1:
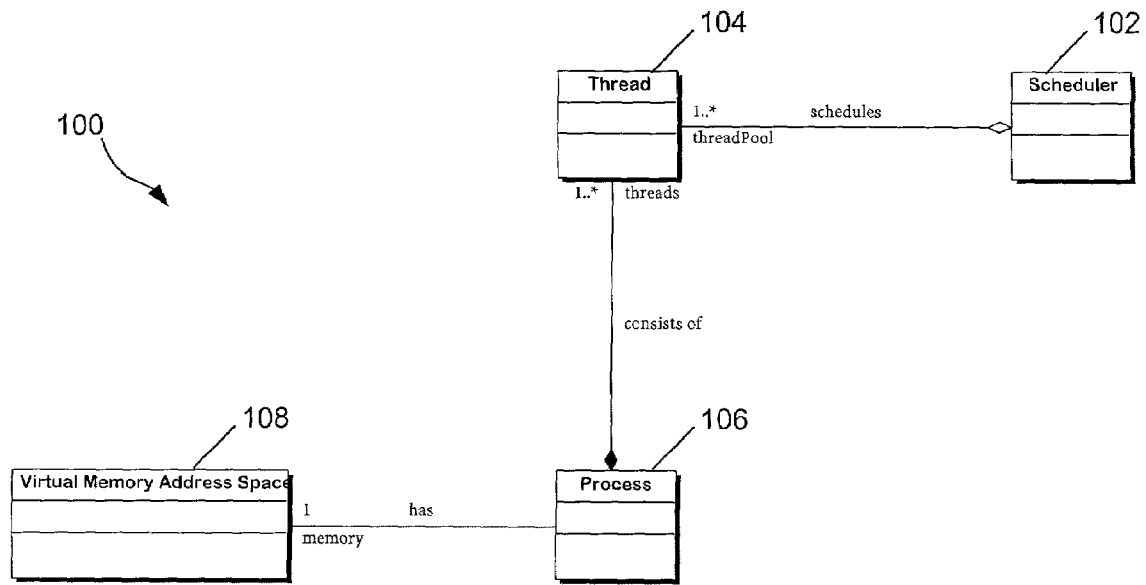
FIG. 1 is a Unified Modeling Language ("UML") diagram of the relationships between the VMAS, a process, a thread, and a scheduler in a MTE.

10 FIG. 1 shows a Unified Modeling Language ("UML") diagram of the relationships between the VMAS, a process, a thread, and a scheduler. One of the most important aspects of a MTE is the scheduling of the individual units of execution. In an MTE 100, the Scheduler 102 is suitably a software component that decides how processor time and resources are apportioned. The Scheduler 102 operates on a thread pool, which contains Threads 104. The thread pool is suitably the congregation of all individual threads that run in the system. The contents of the VMAS 108 are specific to Processes 106. Processes 106 occupy VMAS 108. In general, different Processes 106 occupy different VMAS 108, and different Threads 104 corresponding to a Process 106 share the VMAS that the process occupies. The multiple Threads 104 essentially execute in parallel over the same VMAS 108. It should be noted that it is also possible to share VMAS 108 between Processes 106 when memory is mapped to the same virtual address for more than one Process 106. Because multiple Threads 104 access the same VMAS 108, it is important that the access to the VMAS 108 is synchronized between the Threads such that the same VMAS 108 is not accessed concurrently by more than one Thread 104.

Figure 2:
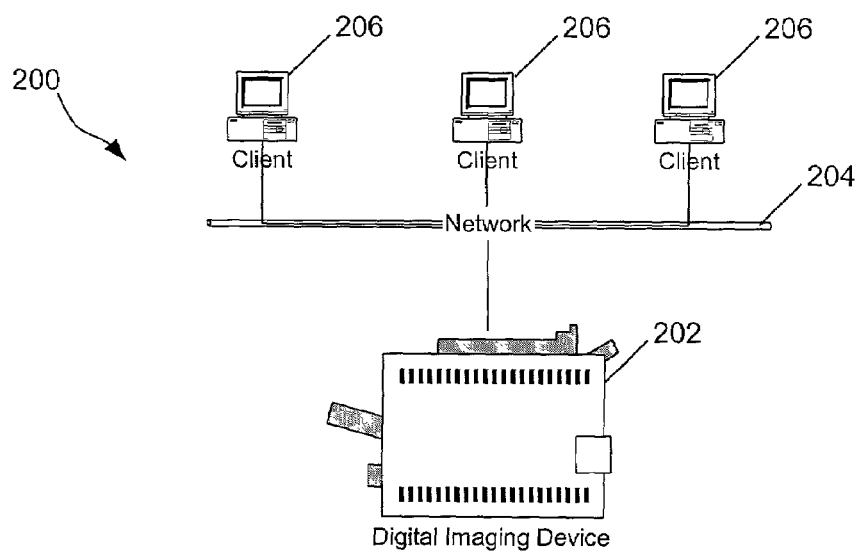
FIG. 2 is a representation of a client-server network with a DID server.

Turning next to FIG. 2, a network illustrative of a typical client-server based LAN or WAN networking environment is provided. The network system 200 comprises a Server 202. The Server 202 suitably comprises internal storage and is suitably any Server for providing data access and like as will be appreciated to one of ordinary skill in the art. Preferably, the Server 202 is a DID having an internal device controller acting as a fully functional server with the necessary hardware and software that ensure proper operation of the DID. In addition, the Server 202 preferably comprises a scheduler. The Server 202 is in data communication with a data transport system 204, suitably comprised of physical and transport layers such as illustrated by a myriad of conventional data transport mechanisms such Ethernet, Token-Ring™, 802.11(B), or other wire-based or wireless data communication mechanisms as will be apparent to one of ordinary skill in the art. The data transport system 204 is also placed in data communication with at least one Client, such as representative Clients 206. The Clients 206 are suitably Thin Clients or Thick Clients. Thus, a data path between one or more Servers, such as that illustrated by Server 202, is in shared data communication with the one or more Clients, such as Clients 206.

Queue Implementation and Circular Array

Figure 3:
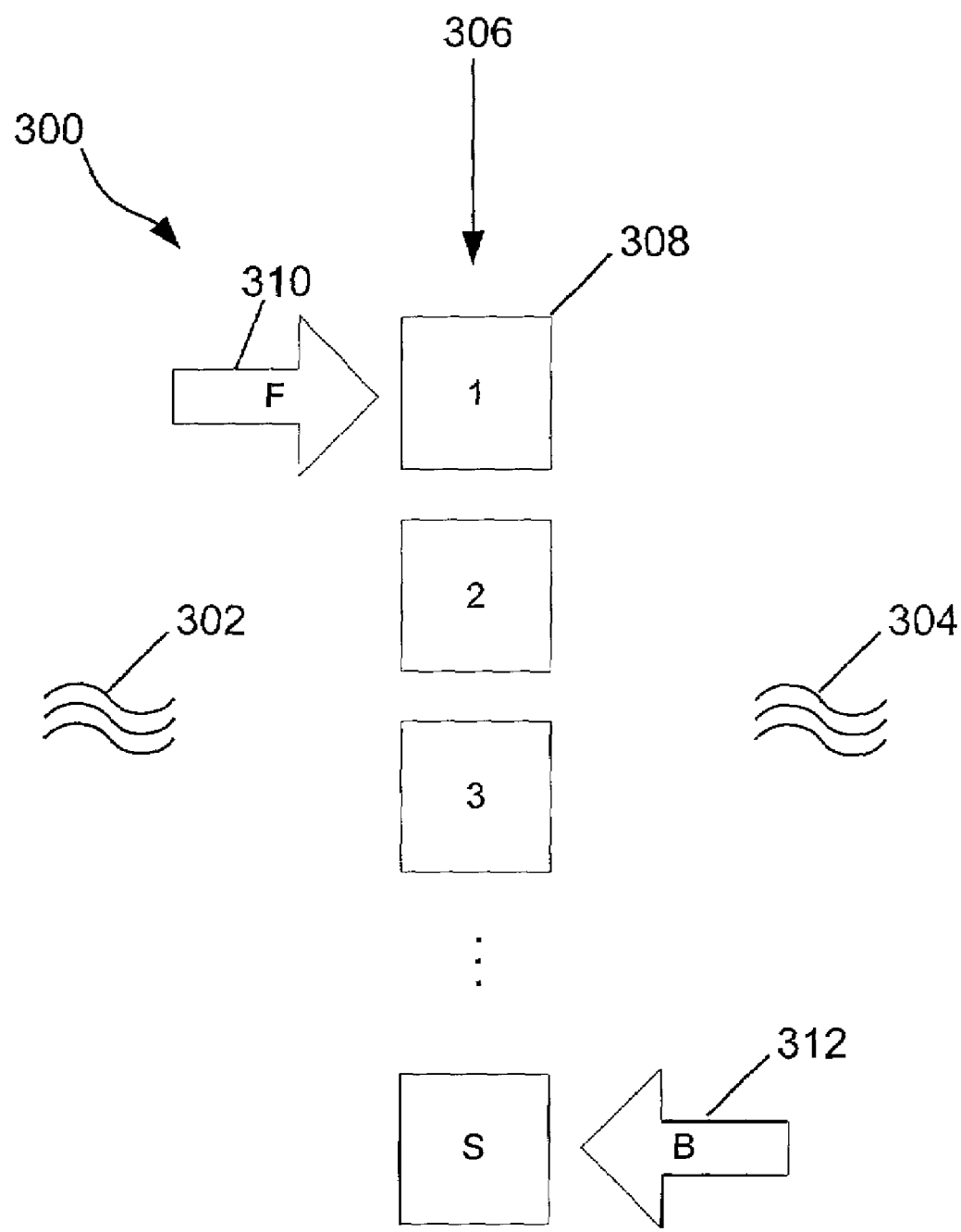
FIG. 3 is a representation of the basic software architecture for RQ implementation.

Turning now to FIG. 3, a diagram illustrating the basic software architecture for the RQ implementation is provided. The basic system architecture 300, comprises two pools of threads maintained by a server: an Enqueueing Pool 302, and a Dequeueing Pool 304. The Enqueueing Pool 302 relates to incoming server requests and the Dequeueing Pool 304 relates to requests that have been processed by the server. It should be noted that if the connections producing incoming requests are not significant in number, the Enqueueing Pool 302 suitably comprises only one thread. Between the Enqueueing Pool 302 and the Dequeueing Pool 304 is the RQ 306. The RQ 306 is suitably an array that serves as intermediate storage for incoming requests until a thread from the Dequeueing Pool 304 becomes available. In the presently preferred embodiment, the RQ 306 follows a First In First Out ("FIFO") processing methodology.

In a presently preferred embodiment, the RQ 306 is a circular array having a modifiable number S of elements 308. Preferably, the number S is selected such that the maximum possible integer number that can be stored in a machine word—MAX_INT—is divisible by S, e.g. for 32-bit word machines, S is suitably any power of 2 up to $2^{32}$. The number S of elements 308 is suitably described by the mathematical condition as follows:

MAX_INT=0(mod $S$).

Integer additions with results beyond MAX_INT yield modulo MAX_INT. Furthermore, a quotient q is suitably an integer and is defined by the following mathematical condition:

$q$=(MAX_INT+1)/$S$.

Therefore, additions of q effectively yield modulo S. Consequently, in order to implement addition of q modulo S to a number F when F is a multiple of q, one simply adds q to F. The preferred embodiment of the present invention exploits these properties in order to simplify the implementation of a circular queue.

The RQ 306 suitably has at least two elements 308 suitably grows only in integer powers of two. This growth restriction permits the use of bit-wise operations rather than multiplication and division. This is necessary to efficiently compute the indices in the circular RQ 306.

Because the RQ 306 can potentially grow or shrink, pointers are preferably used to determine the current state of the RQ 306. It should be noted that a log file, variables, or the like as will be apparent to those skilled in the art are also suitably used to track the state of the RQ 306. Preferably, a first pointer F 310 and a second pointer B 312 function to define where the RQ begins and ends. Because of the RQ 306 FIFO processing, it is essential to know where in the RQ array each end is located. The pointer F 310 representing the front of the array is incremented mod S when adding to the RQ 306, and the pointer B representing the back of the array is incremented mod S when removing from the RQ 306. When F 310 reaches B 312 during the enqueue process, the queue is full. Conversely, when B 312 reaches F 310 during the dequeue process, the queue is empty.

Turning now to FIG. 4, a diagram illustrating the flow of the enqueue process of N into an array element in an embodiment of the present invention is provided. In order to permit non-blocking operation, atomic functions are used. Because the atomic add function is atomic in nature, if two threads attempt to access the same atomic variable at the same time when executing the atomic add function, one of the two threads will be made to wait until the other thread has completed the operation and updated the value F 310. The basic flow of enqueue process 400 commences at start block 402. Flow progresses to process block 404 where the following is performed:

$F_{old}$:=ADD$_{atomic}$($F$, $q$).

This function returns the previous value of F 310, which is the element that F 310 pointed to before the operation was performed. The functionality of the atomic add operation is detailed in FIG. 5.

Progression then flows to decision block 406 where a determination is made the queue is full, or whether $F_{old}$ is equal to B. A positive determination at decision block 406 means that the RQ 306 is full and causes progression to flow to process block 408 where a call is made to increase the size of RQ 306. Flow then progresses back to process block 404 where the atomic add function is executed on the newly resized RQ 306.

A negative determination at decision block 406 causes progression to process block 410. At process block 410, the element N is suitably stored in RQ 306 at the index $F_{old}$/q. At this point, the element N is enqueued and flow progresses to termination block 412.

Turning now to FIG. 5, the functionality of the atomic add operation is illustrated in detail. The basic flow of the atomic add function 500 commences at start block 502. Flow progresses to process block 504 where the hardware data bus is locked. Progression then flows to process block 506 where the value of F is loaded in a register X. Progression continues to process block 508 where q is added to the value of F using indirect memory operand. Flow then progresses to process block 510 where the hardware data bus unlocked. Progression then flows to process block 512 where X is returned, after which flow progresses to termination block 514.

Turning now to FIG. 6, a diagram illustrating the flow of the dequeue process of an array element in an embodiment of the present invention is provided. In order to permit non-blocking operation, atomic functions are again used.

The basic flow of dequeue process 600 commences at start block 602 and flow progresses to process block 604 where the following is performed:

$B_{old} := \text{ADD}_{atomic}(B, q)$, where q is a pre-computed constant.

This function returns the previous value of B 312, which is the element that B 312 pointed to before the operation was performed as is detailed in FIG. 5. The constant q is preferably computed as:

$q := (\text{MAX\_INT}+1)/S$

Again, because the atomic add function is atomic in nature, if two threads attempt to access the same atomic variable at the same time when executing the atomic add function, one of the two threads will be made to wait until the other thread has completed the operation and updated the value B 312.

Progression then flows to decision block 606 where a determination is made whether the queue is empty. The determination of whether the queue is empty is suitably made by testing if the following statement is true:

$CE_{atomic}(B, F, B_{old}) != B_{old}$.

The above function is an atomic compare exchange function where B after the operation was performed is compared to F. If B and F are equal, then B is assigned to $B_{old}$ and $B_{old}$ is returned. The functionality of the atomic compare exchange function is detailed in FIG. 7. A positive determination at decision block 606 means that $B_{old}$ was not returned by the compare exchange function, which in turn means that B and F are not equal and that therefore, the queue is empty. When the queue is empty, flow progresses to process block 608 where an exception for empty queue state is thrown. At this point, there is nothing left to dequeue and progression flows to termination block 612.

A negative determination at decision block 606 causes progression to flow to process block 610 where the array element with index of $B_{old}/q$ is returned, or dequeued. Flow then progresses to termination block 612.

Turning now to FIG. 7, the functionality of the atomic compare exchange operation is illustrated in detail. The atomic compare exchange operation 700 commences at start block 702, from which progression is made to process block 704 wherein the hardware data bus is locked. Flow then progresses to process block 706 wherein the value of location B is stored in a register X. Progression continues to decision block 708 where a determination is made whether X is equal to F.

A negative determination at decision block 708 causes progression to flow to process block 710, wherein X is returned. Flow then progresses to termination block 718.

A positive determination at decision block 708 causes progression to flow to process block 712, wherein $B_{old}$ is stored in memory location B. Flow then progresses to process block 714 wherein the hardware bus is unlocked. Progression then continues to process block 716 where $B_{old}$ is returned. Finally, flow then progresses to termination block 718.

Simultaneous Thread Release

The presently preferred embodiment of the invention calls for maintenance of an enqueueing thread pool, wherin each thread is suitably blocked on a channel. In addition, the invention calls for maintenance of a dequeueing thread pool, wherein a semaphore object suitably controls the number of threads in the dequeueing thread pool that will be unblocked, or awakened, to serve queue requests received through a channel and placed on the queue by enqueueing theads. Furthermore, the presently preferred embodiment comprises a request queue capable of increasing in size to handle additional incoming requests. However, before the request queue can be resized, all threads must be blocked so that nothing is enqueued or dequeued during the process of resizing the queue. When the threads are blocked on the channels, as in the presently preferred embodiment, a blocking semaphore is suitably used to prevent the acquisition of channels during request queue resizing. As used herein, "semaphore" means managing the thread to enqueue incoing requests.

In an alternate embodiment, the request queue suitably maintains a constant size. Therefore, whenever the number of enqueueing threads is less than or equal to the number of incoming communication channels, the threads are preferably blocked on the channels themselves. If, however, the number of enqueueing threads is greater than the number of channels, then an additional "receiving" thread is suitably used to monitor the channels and control the enqueueing threads by altering a semaphore. In such instances, all threads in the pool are suitably synchronized via a single semaphore object. The semaphore object suitably controls how many threads will be unblocked, or awakened, to enqueue incoming requests from the communication channels. It should be noted that the additional receiving semaphore is rarely required because the number of threads rarely exceeds the number of channels.

In general, threads on channels or semaphores are blocked so that they do not execute until there is availability in the RQ 306. The enqueueing subroutine suitably accepts a request for processing whenever such request appears in one of the communication channels connected to the server. The enqueueing process is suitably performed in the enqueueing thread pool 302.

Figures 8, 9:
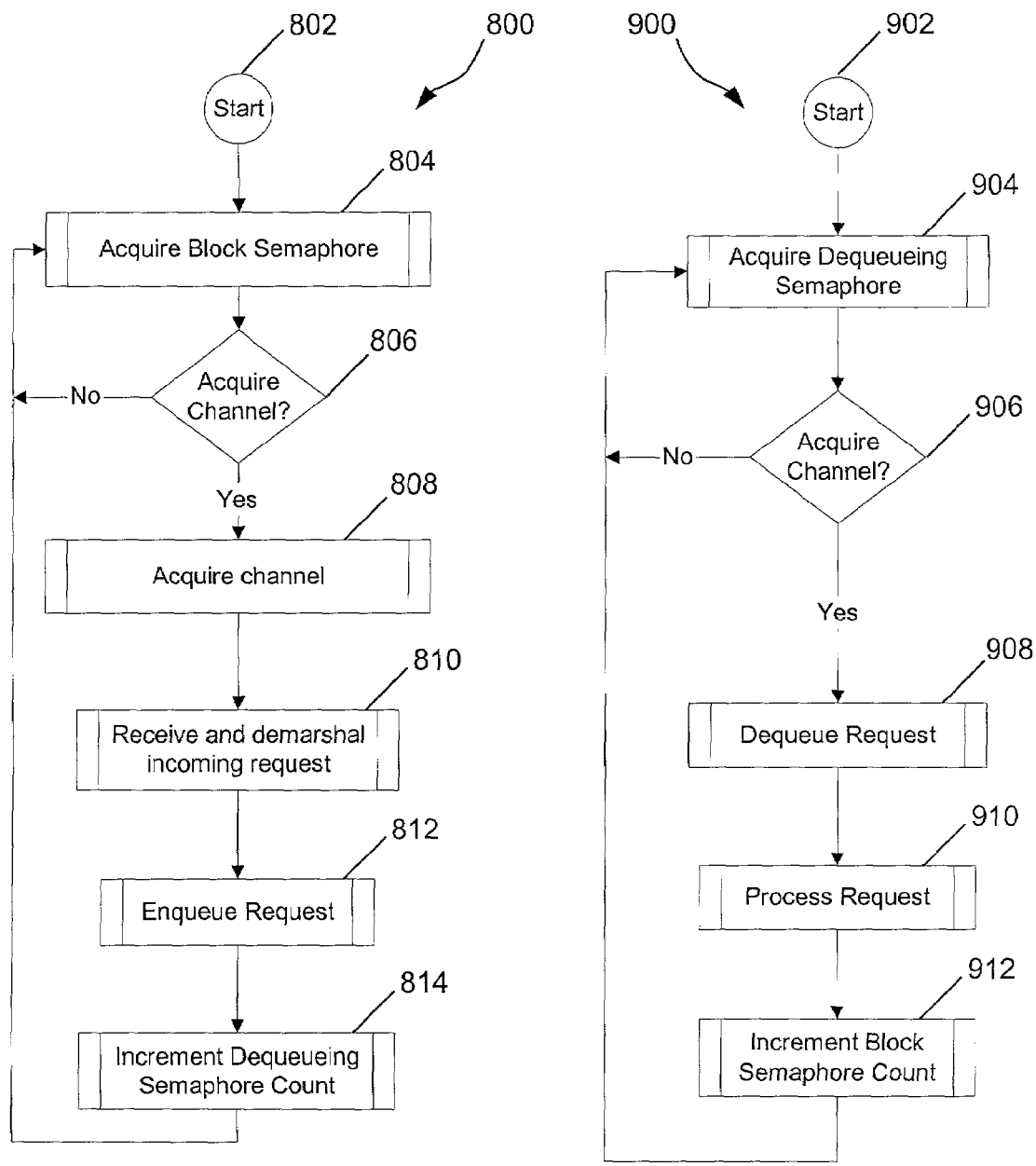
FIG. 8 is a diagram illustrating the enqueueing aspects of simultaneous thread release.
FIG. 9 is a diagram illustrating the dequeueing aspects of simultaneous thread release.

Turning now to FIG. 8, a diagram illustrating the enqueueing aspect of the RQ 306 serving is provided. The process commences at start block 802, from which progression is made to process block 804 wherein a block semaphore is acquired. The blocking semaphore suitably comprises a block semaphore count that controls whether or not a channel is acquired. When the block semaphore is acquired, the block semaphore count is suitably decremented. Preferably, when the RQ 306 is empty, the block semaphore count is greater than the number of elements, S, of the RQ 306, thereby permitting the RQ 306 to fill before the block semaphore count approaches zero.

Progression then flows to decision block 806 where a determination is made whether a channel can be acquired. A negative determination at decision block 806 causes progression to flow back to process block 804 wherein the block semaphore is again acquired.

A positive determination at decision block 806 causes progression to process block 808 wherein an incoming request is received and demarshalled. Flow then continues to process block 810 where the demarshalled request is enqueued. Progresion continues to process block 812 wherein a dequeueing semaphore count is incremented, after which flow loops back to process block 804 wherein the blocking semaphore is again acquired to determine whether or not a channel can be acquired.

The dequeueing process suitably unblocks or awakens threads to service queue requests. The states of all threads in the dequeueing thread pool are suitably controlled via a single semaphore object. The dequeueing semaphore count controls the number of threads that will be unblocked during the next scheduling process.

Turning now to FIG. 9, a diagram illustrating the dequeueing aspect of RQ 306 serving is provided. The process commences at start block 902, from which progression is made to process block 904, where the dequeueing semaphore is acquired. The dequeueing semaphore suitably comprises a dequeueing semaphore count that controls the number of requests to dequeue. When the dequeueing semaphore is acquired, the dequeueing semaphore count is suitably decremented.

Progression then flows to decision block 906 where a determination is made whether a request can be dequeued. A negative determination at decision block 906 causes progression to flow back to process block 904 wherein the dequeueing semaphore is again acquired.

Progression then flows to process block 908 where a request is dequeued. Flow then progresses to process block 910 wherein the request is processed, after which flow loops back to process block 904 where the dequeueing semaphore is again acquired to the number of requests to dequeue.

The present invention permits simultaneous thread release due to the fact that the enqueueing and dequeueing processes as described in FIGS. 8 and 9 are suitably executed in parallel (simultaneously) by a plurality of processors in SMP hardware. The scheduler 102 suitably looks to the dequeueing semaphore count to determine the number of threads 104 to unblock for processing 106. Because the enqueueing process increments the dequeueing semaphore, the present invention permits the dequeueing of requests immediately upon enqueueing a request. This permits a scheduler 102 to simultaneously release or unblock threads 104 as described in FIG. 9 when attempts are made to schedule the blocked dequeueing threads. In essence, SMP hardware permits the execution in parallel of a number of enqueueing processes, and causes at a later point the execution in parallel of the same number of dequeueing processes. It should be noted that simultaneous thread release is suitably achieved in the presently preferred embodiment wherein a blocking semaphore controls whether or not a channel is acquired, and in alternative embodiments wherein no blocking semaphore is used.

Dynamically Growing the Array

In a preferred embodiment of the present invention, the queue is dynamic in that it is suitably resized. Preferably, upon a determination that the queue is full, the queue will be resized so that it has more storage capacity. In the presently preferred embodiment, the queue size is suitably doubled to accommodate bitwise operations. Likewise, upon a determination that the queue has more storage space than is required, the queue is suitably resized so that it has less storage capacity.

Figure 10:
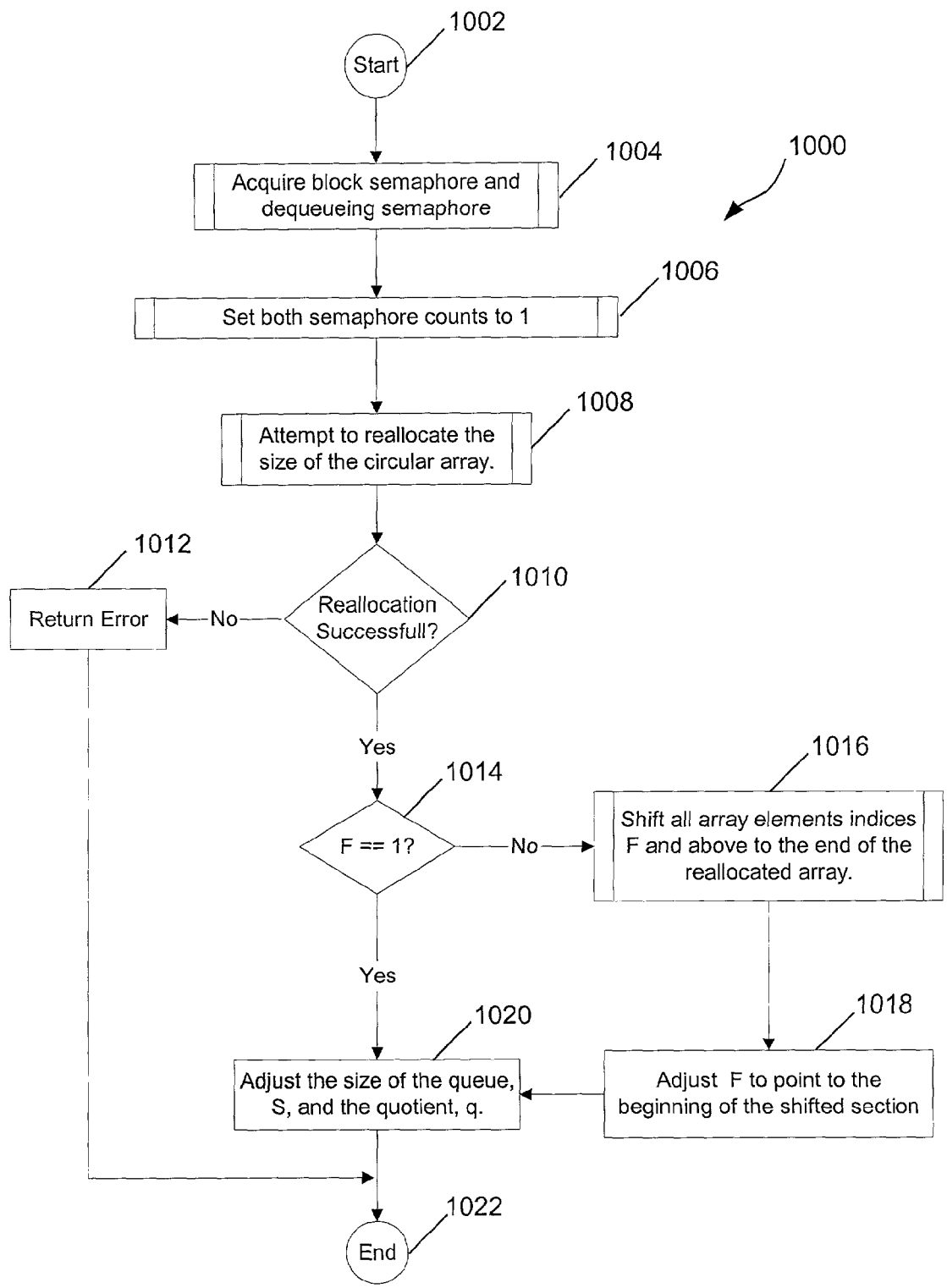
FIG. 10 is a diagram illustrating the process of reallocating the queue.

Turning now to FIG. 10, a diagram illustrating the process for increasing the size of the queue S is provided. The reallocation of the queue preferably doubles the size of the queue S if possible. The GROW_QUEUE subroutine 1000 commences at start block 1002 and continues to process block 1004 wherein the blocking semaphore and the dequeueing semaphore are acquired. Flow progresses to process block 1006 where both semaphore counts are set to 1. This is suitably accomplished by spin locking until both semaphore counts become 1. Setting both semaphore counts to 1 ensures that only the reallocating thread owns the semaphores. Because reallocation of the array is a destructive process, it is important that no other threads access the array during the reallocation process. Alternatively, both of the thread pools are suitably suspended from execution.

Progression then continues to process block 1008 where an attempt is made to increase the size of the queue. Preferably, an attempt is made to double the size of the array. Progression then flows to decision block 1010 where a determination is made whether the attempt to reallocate the size of the array was successful.

A negative determination at decision block 1010 causes progression to process block 1012 where an error is returned, after which flow progresses to termination block 1022.

A positive determination at decision block 1010 preferably causes progression to decision block 1014 where a determination is made whether the index representing the front of the queue, F, points to the first element of the request queue array.

A negative determination at decision block 1014 causes progression to process block 1016 where the element indices from F and above are shifted to the end of the reallocated array Flow then progresses to process block 1018 where F is adjusted to point to the element at beginning of the shifted section of the array. In addition, B is suitably adjusted to point to the element at the end of the array. Progression then flows to process block 1020.

Upon a positive determination at decision block 1014, flow progresses directly to process block 1020 where the size of the queue S and the quotient q are recalculated to match the size of the reallocated array. Progression then continues to process block 1022 where both blocking and dequeueing semaphore counts are restored to their maximum. Flow then progresses to termination block 1024.

Figure 11A:
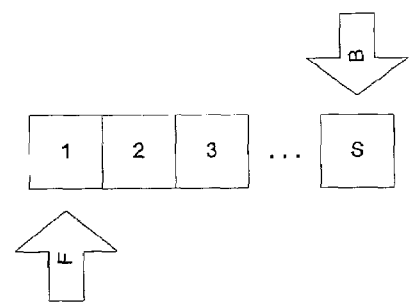
FIG. 11A is an illustration of a queue prior to reallocation where F is equal to 1.
Figure 11B:
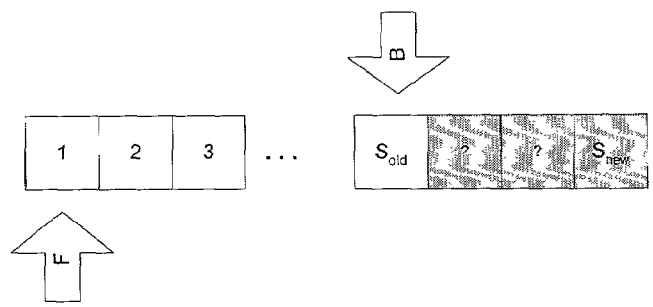
FIG. 11B is an illustration of a queue after reallocation where F was equal to 1 prior to reallocation.

Turning now to FIGS. 11A and 11B an illustration the state of the queue before and after reallocation in process block 1008 where F is equal to 1 is provided. In order to maintain consistent order of execution, all array elements added during reallocation are preferably added after B. In the preferred embodiment having a circular array, all array elements added during reallocation are preferably added after B and before F. Because a reallocation only occurs when the queue is full, prior to reallocation, whenever F is equal to 1, B is necessarily equal to S. Therefore, when the array is reallocated, the added array elements are suitably added to the end of the old array and no shifting of array elements is required in order to reallocate the queue.

Figure 12A:
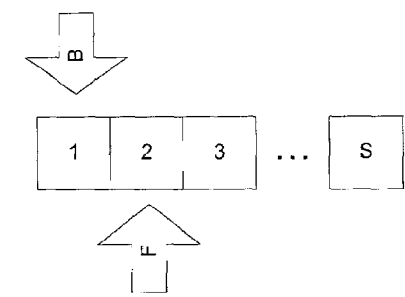
FIG. 12A is an illustration of a queue prior to reallocation where F is not equal to 1.
Figure 12B:
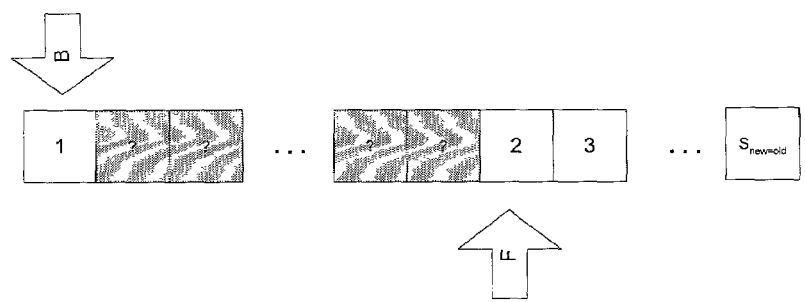
FIG. 12B is an illustration of a queue after reallocation where F was not equal to 1 prior to reallocation.

Turning now to FIGS. 12A and 12B, an illustration is provided the state of the queue before and after reallocation in process block 1008 where F is not equal to 1. If, however, F is not equal to 1, then B does not point to the element at the end of the array. When the array is reallocated, the added array elements are suitably added to the end of the old array. The added elements are therefore added after F and before B. However, to maintain a consistent order of execution, all array elements added during reallocation are preferably located after B and before F as shown in FIG. 12B. To create a request queue of the type shown in FIG. 12B, the new array elements are suitably added after the end of the array of FIG. 12A. Following the addition of the new elements, the contents of the array elements from index F through the end of the array of FIG. 12A are shifted such that the end of the array of FIG. 12A lies at the end of the array of FIG. 12B. In other words, all elements F and above are shifted a number of array elements equal to the number of elements added to the array during reallocation. Thereafter, the new added array elements are located after B and before F.

Although the preferred embodiment has been described in detail, it should be understood that various changes, substitutions, and alterations can be made therein without departing from the spirit and scope of the invention as defined by the appended claims. It will be appreciated that various changes in the details, materials and arrangements of parts, which have been herein described and illustrated in order to explain the nature of the invention, may be made by those skilled in the area within the principle and scope of the invention as will be expressed in the appended claims.

What is claimed is:

1. A computer-implemented method for serving a request queue in a system comprising a plurality of channels, the method comprising the steps of:
   a) acquiring a blocking semaphore to determine a number of channels to acquire;
   b) decrementing a blocking semaphore count in accordance with the number of channels;
   c) acquiring at least one channel from which an incoming request is received;
   d) receiving a request;
   e) enqueueing the received request, comprising the steps of:
      1) determining if the queue is full;
      2) increasing a size of the queue upon a determination that the queue is full; and
      3) storing the request in an empty element of the queue;
   f) incrementing a dequeueing semaphore count in accordance with a number of enqueueing requests;
   g) acquiring a dequeueing semaphore to determine a number of requests to dequeue;
   h) decrementing a dequeueing semaphore count in accordance the number of requests to dequeue;
   i) dequeueing an enqueued request, comprising the steps of
      1) determining if the queue is empty; and
      2) returning an array element for processing upon a determination that the queue is not empty;
   j) processing a dequeued request; and
   k) incrementing a blocking semaphore count in accordance with the number of channels.

2. The method of claim 1, wherein the request queue is a circular array.

3. The method of claim 1, wherein determining if the queue is full comprises a step of performing an atomic add operation on a first element index and returning a second element index.

4. The method of claim 1, wherein increasing a size of the queue comprises the steps of:
   a) acquiring the blocking semaphore and the dequeueing semaphore; and
   b) suspending all enqueueing and dequeueing operations.

5. The method of claim 1, wherein determining if the queue is empty comprises a step of performing an atomic compare exchange operation on first and second element indices and returning a third element index.

6. A computer-implemented method for choosing and serving a circular array request queue comprising the steps of:
   a) selecting an integral number of array elements, S1, such that a maximum possible integer number stored in a machine word, MAX_INT, is divisible by S1 as shown in the following equation:

$$\text{MAX\_INT} = 0 (\text{mod } S1);$$

b) indexing each array element such that the element index is a multiple of quotient, q, wherein q is defined by the following equation:

$$q1 = (\text{MAX\_INT} + 1)/S1;$$

c) acquiring a blocking semaphore to determine a number of channels to acquire;
   d) decrementing a blocking semaphore count in accordance with the number of channels;
   e) acquiring at least one channel from which an incoming request is received;
   f) receiving a request;
   g) enqueueing the received request, comprising the steps of:
      1) determining if the queue is full;
      2) increasing a size of the queue upon a determination that the queue is full; and
      3) storing the request in an empty element of the queue;
   h) incrementing a dequeueing semaphore count in accordance with a number of enqueueing requests;
   i) acquiring a dequeueing semaphore to determine the number of requests to dequeue;
   j) decrementing a dequeuing semaphore count in accordance with the number of requests to dequeue;
   k) dequeueing an enqueued request, comprising the steps of
      1) determining if the queue is empty; and
      2) returning an array element for processing upon a determination that the queue is not empty;
   l) processing the dequeued request; and
   m) incrementing a blocking semaphore count in accordance with the number of channels.

7. The method of claim 6, wherein increasing a size of the queue comprises the steps of:
   a) acquiring the blocking semaphore and the dequeueing semaphore;
   b) suspending all enqueueing and dequeueing operations;
   c) selecting an integral number of array elements, S2, such that S2 is greater than S1 and such that the maximum possible integer number stored in a machine word, MAX_INT, is divisible by S2 as shown in the following equation:

$$\text{MAX\_INT} = 0 (\text{mod } S2); \text{ and}$$

d) indexing each array element such that the element index is a multiple of quotient, q, wherein q is defined by the following equation:

$$q2 = (\text{MAX\_INT} + 1)/S2.$$

8. The method of claim 7, wherein S2 is twice S1.

* * * * *